(12) United States Patent
Papenfuss et al.

(10) Patent No.: US 6,559,395 B2
(45) Date of Patent: May 6, 2003

(54) CANCELING DEVICE FOR A BLINKER SWITCH IN MOTOR VEHICLES

(75) Inventors: Jürgen Papenfuss, Sachsenheim (DE); Otto Machalitzky, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 0 days.

(21) Appl. No.: 09/912,348

(22) Filed: Jul. 26, 2001

(65) Prior Publication Data

US 2002/0017987 A1 Feb. 14, 2002

(30) Foreign Application Priority Data

Aug. 2, 2000 (DE) .......................... 100 37 585

(51) Int. Cl.$^7$ ................................ H01H 3/16
(52) U.S. Cl. ................................ 200/61.36
(58) Field of Search .................. 200/61.35, 61.36, 200/61.3; 74/484 R

(56) References Cited

U.S. PATENT DOCUMENTS 5,030,802 A * 7/1991 Noro .................. 200/61.35 X
6,260,431 B1 * 7/2001 Yokoyama ............ 74/484 R X

FOREIGN PATENT DOCUMENTS

| DE | 25 15 754 | 10/1976 |
|----|-----------|---------|
| DE | 26 29 551 | 2/1978 |
| DE | 28 23 142 | 11/1979 |
| DE | 29 17 107 | 6/1980 |
| DE | 35 02 650 | 8/1986 |
| DE | 36 03 820 | 8/1987 |
| DE | 199 35 089 | 2/2000 |
| EP | 0 291 398 | 11/1988 |

* cited by examiner

Primary Examiner—Renee Luebke
(74) Attorney, Agent, or Firm—Paul Vincent

(57) ABSTRACT

A canceling device (10) effects automatic cancellation of a switched position of a blinker switch. The canceling device (10) comprises a trigger finger (14) which can be rotated about an axis and which can also be displaced. The trigger finger is loaded towards a steering shaft by a spring (72). To reduce the dimensions of the canceling device (10), the spring is a leaf spring (72), one side of which loads the trigger finger (14) towards the steering shaft and the other side of which is supported on a casing (12) of the canceling device (10).

6 Claims, 3 Drawing Sheets

CANCELING DEVICE FOR A BLINKER SWITCH IN MOTOR VEHICLES

This application claims Paris Convention priority of DE 100 37 585.5 filed Aug. 2, 2000 the complete disclosure of which is hereby incorporated by reference.

BACKGROUND OF THE INVENTION

The present invention concerns a canceling device for a blinker switch in motor vehicles which is disposed in the vicinity of a steering shaft and effects automatic canceling of the blinker switch from one of the two switched positions into the neutral central position, comprising a casing and a movable trigger finger which, in the switched positions, projects into the circular path of a cam connected to the steering shaft and is pretensioned towards the steering shaft, and comprising a switching piece which is disposed about an axis substantially parallel to the steering shaft and is provided with catch elements engaging in catch profiles and which cooperates with the trigger finger.

A canceling device of this type has been commercially available. When the blinker switch is actuated, the switching piece releases the trigger finger which moves radially inward towards the steering shaft and projects into the circular path of the cam connected to the steering shaft. Release of the trigger finger is effected by a helical pressure spring which is supported on one side on the trigger finger and on the other side on the casing of the canceling device.

The known canceling device functions well, however, there are two main disadvantages. Modern vehicles provide only little space in the region of the steering shaft which makes installation of the relatively large-volume canceling device difficult. Moreover, the known canceling device is relatively complicated to produce so that the associated cost cannot always be justified for modern motor vehicles.

It is therefore the underlying purpose of the present invention to further develop a canceling device of the above-mentioned type such that it is smaller and less expensive.

SUMMARY OF THE INVENTION

This object is achieved in a canceling device of the above-mentioned type in that it comprises a leaf spring, one side of which loads the trigger finger towards the steering shaft and the other side of which is supported on the casing.

In accordance with the invention, it has been determined that a reason for the relatively large size of the conventional canceling device is the manner in which the trigger finger is pretensioned. The known canceling device uses a helical pressure spring which requires a rather large guide to prevent bending. An intermediate piece, disposed between the spring and trigger finger, is also required.

The helical pressure spring, its guide and the intermediate piece require space which is no longer available. These components are no longer required in the inventive canceling device. Leaf springs typically exhibit an intrinsic stiffness such that the guide can be omitted and a leaf spring can load the trigger finger without an intermediate piece. The overall leaf spring provided in accordance with the invention is therefore much smaller than the conventional helical pressure spring. The parts required for guiding the conventional helical pressure spring and for connection to the trigger finger can be omitted in the inventive canceling device to reduce the direct production costs and the costs for assembly of the canceling device.

Further advantageous developments of the invention are given in the dependent claims.

An embodiment of the invention is described in detail below with reference to the accompanying drawing.

DESCRIPTION OF THE PREFERRED EMBODIMENT

Figure 1:
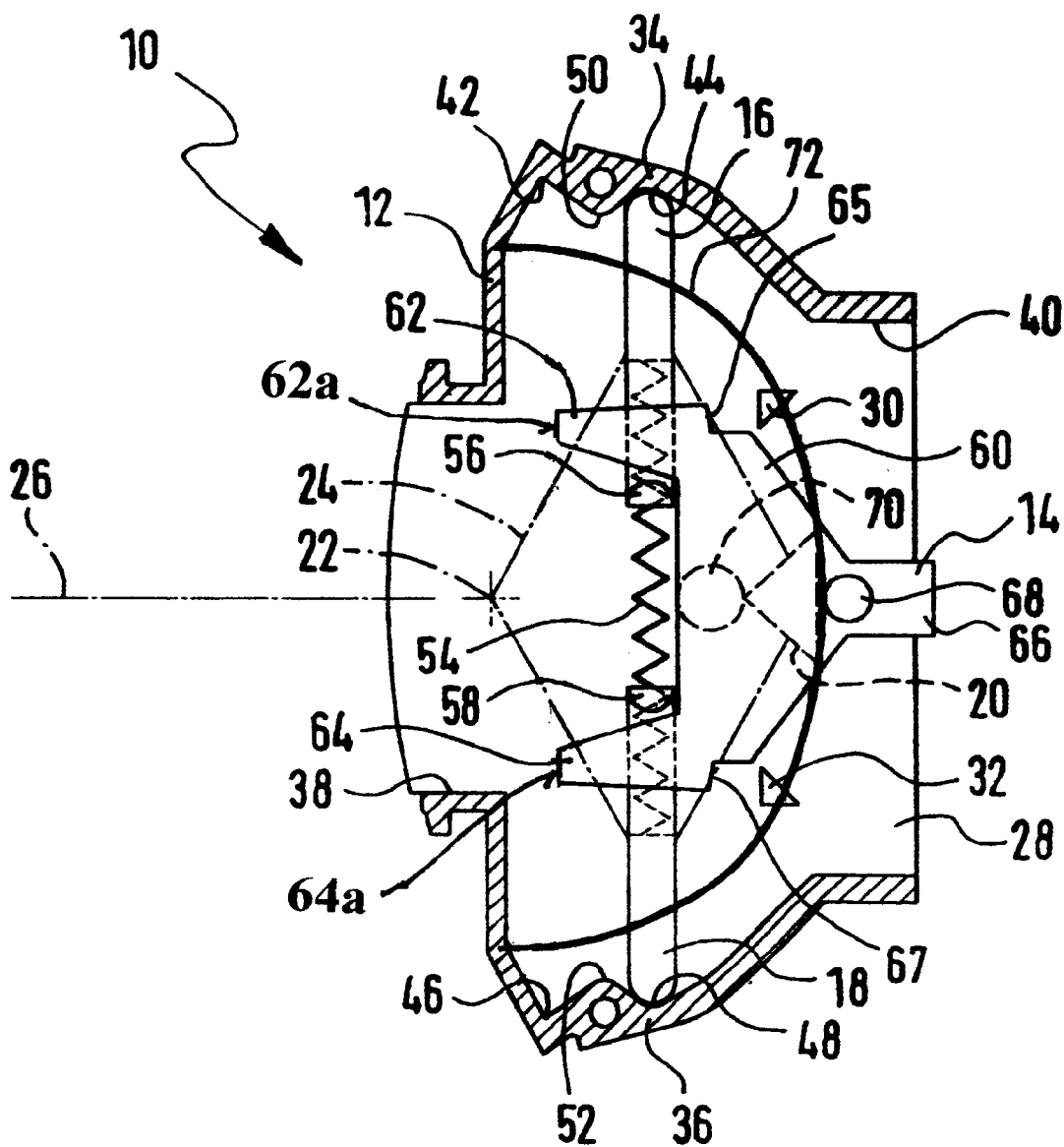
FIG. 1 shows a view, partly cut away, of essential components of a canceling device in its neutral, central position.

The overall canceling device for a blinker switch in a motor vehicle is designated with the reference numeral 10 in FIG. 1. It comprises a casing 12, a trigger finger 14 and a switching piece of which only the catch elements 16 and 18, a triangular locking element 20 and the point of rotation 22 are shown for reasons of clarity. The overall switching piece is designated with reference numeral 24 and is symbolically indicated by dash-dotted lines with which the catch elements 16 and 18, the triangular locking element 20 and the point of rotation 22 are interconnected. A blinker lever, also indicated only with dash-dotted lines, has been designated with reference numeral 26.

The casing 12 consists of a bottom 28 which is entirely flat, from which two triangular stops 30 or 32 extend in a perpendicular direction. The overall casing 12 is symmetrically constructed with respect to a horizontal plane (FIG. 1) having two wall sections 34 and 36 disposed perpendicularly to the bottom 28. An opening 38 is formed between the two wall sections 34 and 36 (on the left in FIG. 1) through which the blinker lever 26 extends. An opening 40 is provided between the two wall sections 34 and 36 (right side in FIG. 1) through which the trigger finger 14 can extend (further explained below).

The two wall sections 34 and 36 are designed as catch profiles comprising two catch depressions 42 and 44 or 46 and 48. A raised locking section 50 is provided between the catch depressions 42 and 44 in the upper wall section 34 and a raised locking section 52 is provided between the two catch depressions 46 and 48 in the lower wall section 36.

The catch elements 16 and 18 of the switching piece 24 are guided in a body (not shown in the drawing). They extend, in the neutral central position shown in FIG. 1, perpendicularly from the center downwards into the catch depression 48 or perpendicularly upwards into the catch depression 44. The radially inner sections of the two catch elements 16 and 18 are hollow and contain a helical pressure spring 54 which loads the two catch elements 16 and 18 against the wall sections 34 or 36. The ends of the catch elements 16 or 18 facing the wall sections 34 or 36 are rounded. One semi-circular cam projection 56 or 58 is formed on the radially inner ends of the two catch elements 16 and 18, respectively.

The trigger finger 14 has an overall triangular base section 60 (shown in the top view of FIG. 1) on each of whose (in FIG. 1) upper and lower corner points, one carrier foot 62 and 64 is formed. Each inner wall of the carrier feet 62 and 64 is inclined such that the width of the carrier feet 62 and 64 is smaller at the tip than in the region facing the base section 60.

A stepped projection 65 or 67 is formed in the outline of the base section 60 in the region of the upper and lower corner points which cooperate with the stops 30 or 32 in a fashion which will be described below.

A carrier 66 is formed at the tip of the triangular base section 60 which projects only slightly through the opening 40 in the casing 12 in the central position of the canceling device 10 (FIG. 1). Two pins are formed on the trigger finger 14 which are aligned perpendicularly to the plane of the drawing of FIG. 1. One pin 68 is disposed in the region of the tip of the triangular base section 60 and extends towards the observer, whereas the pin 70 provided in the region of the left edge of the base section 60 extends away from the observer.

A small recess (without reference numeral) is provided in the regions of the wall sections 34 and 36 extending from the top to the bottom in FIG. 1 into which one end of a leaf spring 72 is inserted which extends in a curved fashion towards the opening 40 in the casing 12 and is supported on the pin 68 in a groove (not shown). Alternatively, the leaf spring can engage at any other point of the trigger finger 14, e.g. on front surfaces 62a and 64a of the carrier feet 62 and 64.

Figure 2:
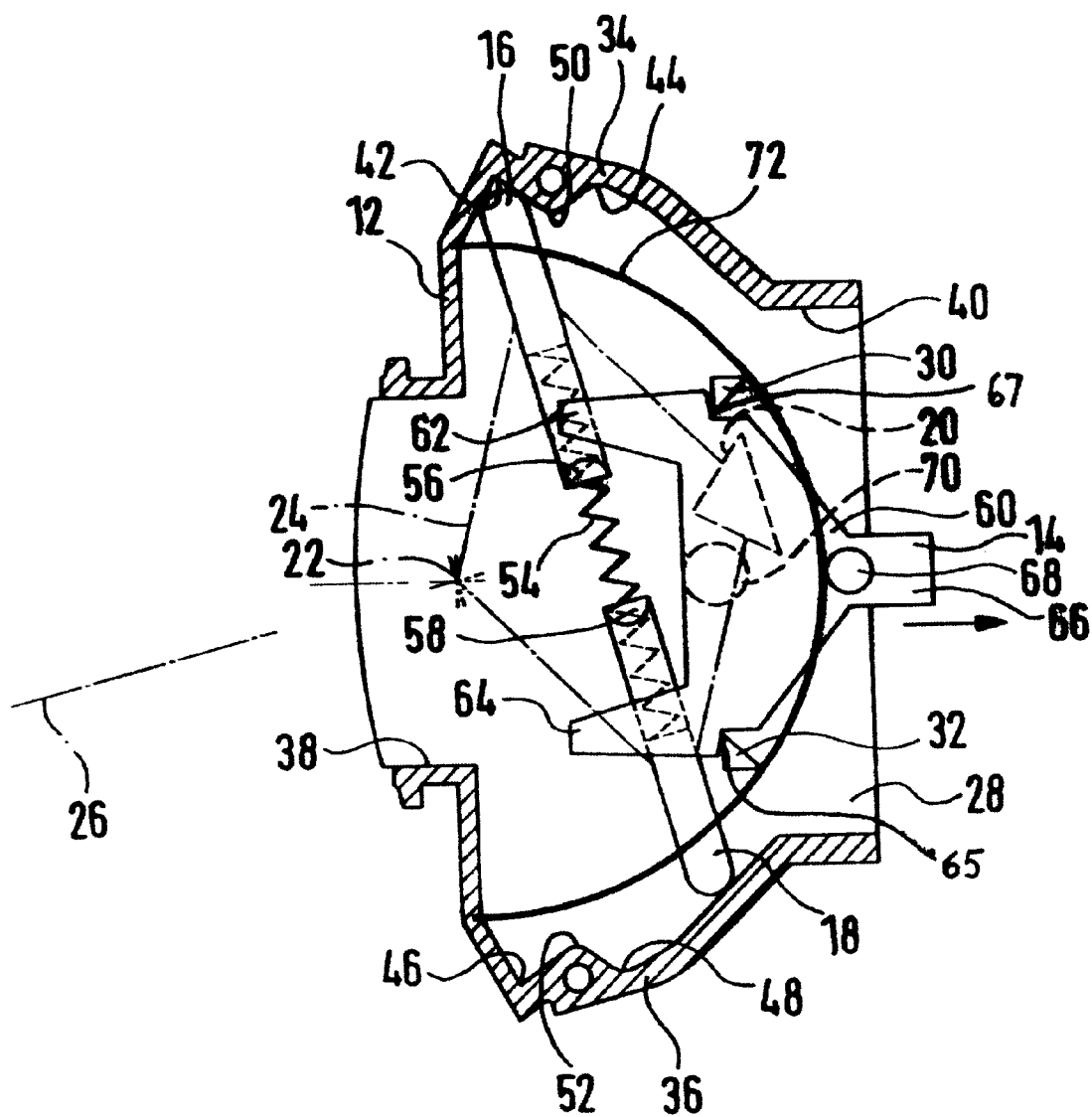
FIG. 2 shows a view of the canceling device of FIG. 1 in one of its switched positions.
Figure 3:
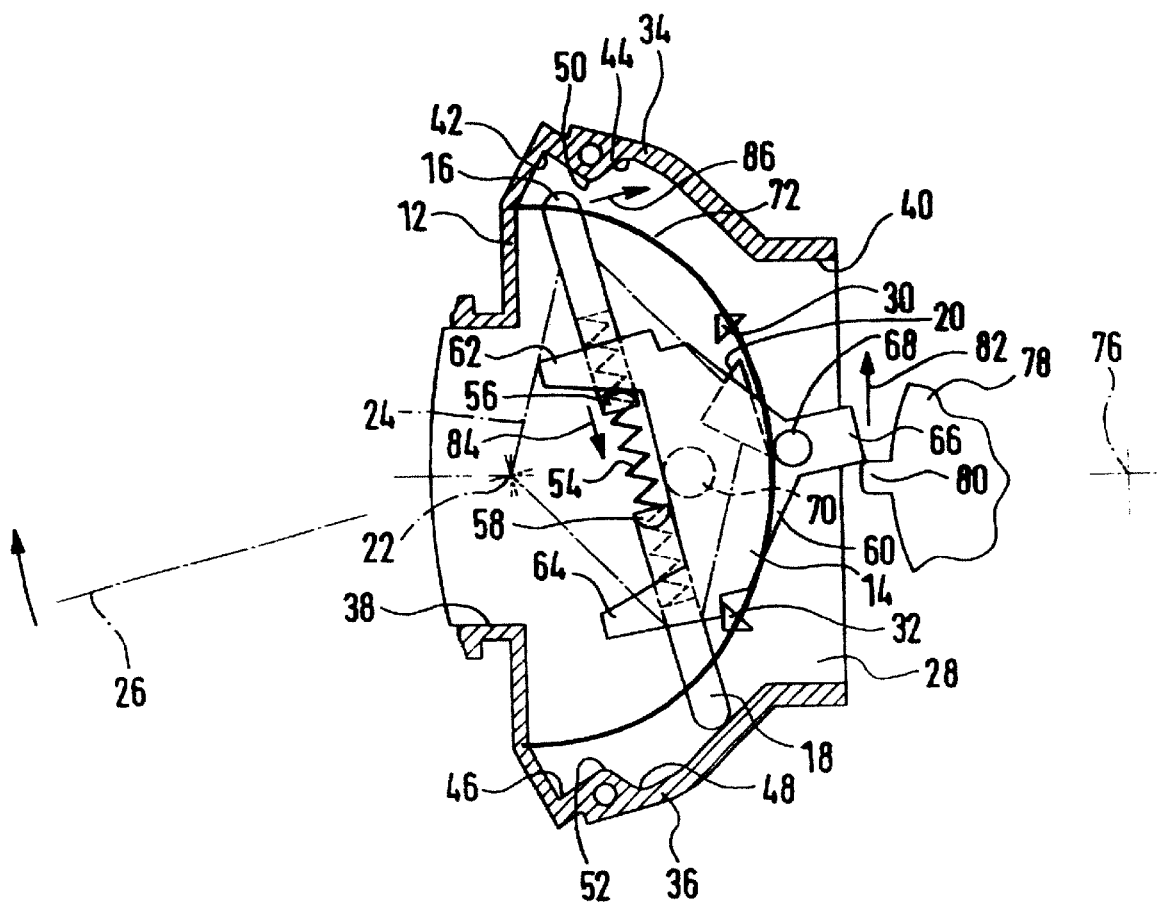
FIG. 3 shows a view of the canceling device of FIG. 1 during automatic cancellation.

The function of the restoring device 10 is explained with reference to FIGS. 1 through 3.

As mentioned above, the two ends of the catch elements 16 and 18 lie in the catch depressions 44 and 48 in the wall sections 34 and 36 in the neutral central position shown in FIG. 1 thereby locking the blinker lever 26 in the horizontal position of FIG. 1. The triangular locking element 20, which is also part of the switching piece 24, is located in a central position approximately on the vertically central axis of the opening 40.

The pin 70 of the trigger finger 14 abuts the tip of the triangular locking element 20. The trigger finger 14 is loaded by the leaf spring 72 in this position which abuts the pin 68 of the trigger finger 14. Movement of the trigger finger 14 to the right (FIG. 1), i.e. out of the opening 40 in response to the loading direction by the leaf spring 72 is prevented by the triangular locking element 20.

When the user pushes the blinker lever 26 downward, the switching piece 24 also pivots about the point of rotation 22. The catch element 16 is thereby moved against the rising locking section 50 in opposition to the spring force of the helical pressure spring 54. When the catch element 16 has overcome the locking section 50, it is pressed into the catch depression 42 by the force of the helical pressure spring 54. This position of the switching piece 24 is shown in FIG. 2.

The rotary motion of the switching piece 24 produces an upward motion of the triangular locking element 20 and the trigger finger 14 moves in the direction of the arrow 74 corresponding to the loading direction of the leaf spring 72 until it abuts with its stepped projections 65 and 67 on the stops 30 and 32. In this position (shown in FIG. 2), the carrier 66 of the trigger finger 14 clearly projects past the edge of the opening 40.

In this position, the leaf spring 70 has a circular shape, i.e. its center coincides with the point of rotation 22. Rotation of a steering wheel (not shown in the figure) also correspondingly rotates an associated steering shaft (also not shown in the drawing). The axis of the steering shaft is perpendicular to the planes of the drawings of FIGS. 1 through 3. Its position is represented by a dash-dotted cross designated with 76. A carrier disc 78 is connected to the steering shaft which carries a cam 80 at its radially outer edge.

Due to the rotary motion, the cam 80 forces the carrier 66 of the trigger finger 14 in the direction of the arrow 82 thereby pivoting the entire trigger finger 14 about an axis which extends parallel to the axis 76 of the steering shaft and passes through the contact point between the stepped projection 67 of the trigger finger 14 and the stop 32 of the casing 12. Due to this pivoting motion of the trigger finger 14, the upper carrier foot 62 (FIG. 3) presses against the cam projection 56 of the catch element 16. This causes the retraction of the catch element 16 from the catch depression 42 in the direction of the arrow 84 in opposition to the loading direction of the helical pressure spring 54.

Since the other catch element 18 is pressed by the helical pressure spring 54 at an inclined angle against the wall section 36, the switching piece 24 is pivoted in the direction of the arrow 86 back into its neutral central position (shown in FIG. 1). During this pivoting motion of the switching piece 24, the pin 70 formed on the trigger finger 14 slides along the triangular locking element 20 thereby pressing the trigger finger 14, against the loading direction of the leaf spring 72, back into its initial position shown in FIG. 1 in which the pin 70 abuts the tip of the triangular locking element 20 to lock the trigger finger 14. In this position, the carrier 66 projects only slightly beyond the edge of the opening 40.

The trigger finger 14 comprises a projection 68 which extends substantially parallel to the axis 76 of the steering shaft and on which the leaf spring 72 engages. A projection 68 of this type produces a defined contact surface between the trigger finger 14 and the leaf spring 72 without requiring a separate part or special means on the leaf spring 72 itself. The leaf spring 72 may also abut on a rear side of the trigger finger 14.

A projection 68 of this type can simultaneously serve to guide the trigger finger 14 relative to the casing 12, wherein the casing 12 is provided with a groove which extends perpendicular to the axis 76 of the steering shaft and in which the projection 68 engages.

The inventive canceling device 10 can also be designed such that the leaf spring 72 is substantially circularly curved in the switched position, with the center of the circle lying approximately at the point of rotation 22 of the switching piece 24. When the leaf spring 72 is shaped and disposed in this fashion, the amount of deformation of the leaf spring 72 caused by motion of the trigger finger 14 from the released into the locked state, is relatively small and sufficiently uniform that the rotary motion of the trigger finger 14 effected upon actuation thereof is not obstructed by the leaf spring 72.

At least one end of the leaf spring 72 is received in a recess in the casing 12. A curved leaf spring 72 which is tensioned on both sides can be borne by clamping the leaf spring 72 between two recesses in the casing 12. A leaf spring 72 which is tensioned on one side only can also be easily accommodated in this manner.

At least one end of the leaf spring 72 can be formed on the casing 12. It can generally be assumed that the leaf spring 72 is produced from a different material than the casing 12. This is, however, not a problem since the casing 12 can be produced with two-component techniques. This further development considerably simplifies production of the inventive canceling device 10, thereby further reducing costs.

It is often desirable to omit metal components for manufacture of the inventive canceling device 10. To nevertheless provide an amount of adjustment force which could be required from the leaf spring 72, a further development of the invention proposes production of the leaf spring 72 from a fiber-reinforced plastic material, wherein it is favorable to dispose the fibers in one, longitudinal direction of the leaf spring 72.

Relative motion occurs between the leaf spring 72 and the trigger finger 14 during operation, primarily the rotary motion of the trigger finger 14 when actuated. It can therefore be advisable to reinforce the region of the leaf spring 72 which abuts the trigger finger 14.

We claim:

1. A canceling device for a blinker switch in a motor vehicle, the canceling device disposed in a vicinity of a steering shaft to effect automatic canceling of the blinker switch from one of two switched positions into a neutral control position when actuated by a steering shaft cam cooperating with the steering shaft, the device comprising:

a casing defining catch profiles, said casing having a rear opening;

a switching piece disposed in the casing for pivoting about an axis which is substantially parallel to an axis of the steering shaft, said switching piece having catch elements engaging in said catch profiles of said casing;

a movable trigger finger cooperating with said switching piece, said trigger finger projecting through said rear opening into a circular path of the steering shaft cam in switched positions; and a leaf spring supported on said casing and engaging said trigger finger to bias said trigger finger towards the steering shaft, said leaf spring curving from an upper front section of said casing towards said rear opening to engage a surface portion of said trigger finger facing away from said rear opening, said leaf spring looping back from said surface portion towards a lower front section of said casing.

2. The canceling device of claim 1, wherein said trigger finger has a projection which extends substantially parallel to the steering shaft axis and on which said leaf spring engages.

3. The canceling device of claim 1, wherein said leaf spring is substantially circularly curved in a switched position, wherein a center of said circular curve lies approximately at a point of rotation of said switching piece.

4. The canceling device of claim 1, wherein at least one end of said leaf spring is accommodated in a recess in said casing.

5. The canceling device of claim 1, wherein said leaf spring is produced from a fiber-reinforced plastic material.

6. The canceling device of claim 1, wherein said leaf spring is substantially circularly curved in a switched position.

* * * * *